Figure 1:
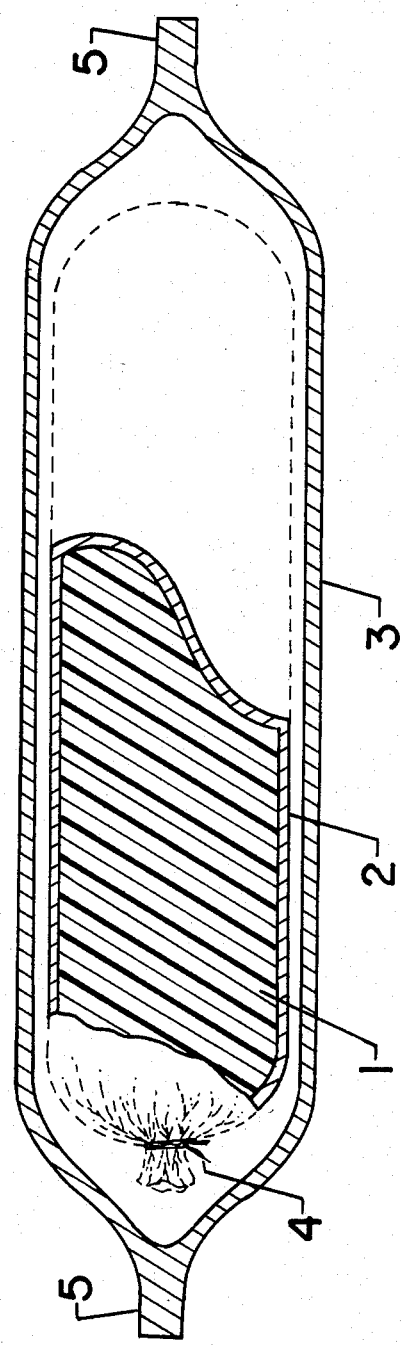

United States Patent [19]

Kadono et al.

[11] Patent Number: 4,514,446
[45] Date of Patent: Apr. 30, 1985

[54] WATER IMPERMEABLE PACKAGE FOR ROOM TEMPERATURE-MOISTURE CURING ONE-PART SEALANTS

[75] Inventors: Motoaki Kadono; Shingo Tamura, both of Chiba, Japan

[73] Assignee: Toray Silicone Company, Ltd., Tokyo, Japan

[21] Appl. No.: 273,696

[22] Filed: Jun. 15, 1981

Related U.S. Application Data

[63] Continuation-in-part of Ser. No. 931,594, Aug. 7, 1978, abandoned.

[51] Int. Cl.³ .............................................. B65D 81/34
[52] U.S. Cl. ................................... 428/35; 53/449; 222/94; 426/126; 428/458; 428/461
[58] Field of Search ................ 206/205, 526; 428/35, 428/458, 461, 76; 222/94, 95, 107, 209; 53/449; 426/124, 126, 127

[56] References Cited

U.S. PATENT DOCUMENTS

| | | | |
|---|---|---|---|
| 2,911,307 | 11/1959 | Handler | 206/526 |
| 3,223,289 | 12/1965 | Bouet | 222/107 |
| 3,386,645 | 6/1968 | Powell | 206/484 |
| 3,389,833 | 6/1968 | Ramis | 222/95 |
| 3,502,381 | 3/1970 | Fish | 206/205 |
| 3,565,293 | 2/1971 | Schultz | 222/107 |
| 3,584,211 | 6/1971 | Rauhut | 222/94 |
| 3,616,190 | 10/1971 | Shaw | 428/458 |
| 3,770,122 | 11/1973 | Thiele | 206/84 |
| 3,916,048 | 10/1975 | Walles | 428/35 |
| 3,936,334 | 2/1976 | Kushida et al. | 222/94 |
| 3,949,114 | 4/1976 | Viola et al. | 428/458 |
| 4,020,978 | 5/1977 | Szczepanski | 222/209 |
| 4,039,103 | 8/1977 | Juillet | 222/95 |
| 4,040,515 | 8/1977 | Hessel et al. | 206/484 |
| 4,142,630 | 3/1979 | Hayes | 428/35 |

FOREIGN PATENT DOCUMENTS

2364219  6/1975  Fed. Rep. of Germany ...... 426/124

*Primary Examiner*—John E. Kittle
*Attorney, Agent, or Firm*—Robert L. McKellar

[57] ABSTRACT

What is disclosed is a water impermeable package for room temperature, moisture curing, one-part sealants. The packages are characterized by having a sealable inner flexible resin film container which is wrapped with a sealable aluminum laminated second resin film or a sealable resin film with vacuum-deposited aluminum.

10 Claims, 1 Drawing Figure

WATER IMPERMEABLE PACKAGE FOR ROOM TEMPERATURE-MOISTURE CURING ONE-PART SEALANTS

BACKGROUND OF THE INVENTION

This application is a continuation-in-part of application Ser. No. 931,594 filed Aug. 7, 1978 abandoned.

This invention deals with a new package which is useful for the storage and eventual delivery of one-part, room temperature, moisture curable sealants.

At the present time, one-part, room-temperature, moisture curable sealants are marketed in containers which are thin aluminum tubes, cartridges or metal cans.

The effective storage period of the one part room temperature, moisture-curing, sealants in these containers is generally one year or longer. No hardening occurs during the storing period between the time of filling and the time of use.

However, the packaging of such sealants in a metal can requires repeated transfer-filling operations such as the sucking of the material into the caulking gun at the time of the application and leads to poor work efficiency on the job. In addition, because air tends to be incorporated into the sealant at the time of its loading into the caulking gun, air bubbles are likely to be mixed into the sealing compound when it is applied into joints. Sealants packaged in a cartridge can be easily handled at the work site requiring only the loading of the cartridge into the caulking gun. However, in this case the cost for the container is high, and the emptied container after the application, retains the original shape, thus posing a problem in terms of waste disposal.

Compared with the prior art containers, the filling and packing of a sealant into a cylindrical or near-cylindrical soft and flexible film container of a size matching that of a caulking gun allows easy loading of a caulking gun with sealant, free from the generation of air bubbles, and the cost for the materials for the package is far lower than that for a cartridge. In addition, such a film container, being pressed flat after the use of the contents, produces a strikingly low amount of waste compared with empty cartridges.

However, when room-temperature/moisture-curing, one-part sealants such as silicone, polyurethane, polysulfide, etc., are filled and packed in cylindrical film containers of soft and flexible films 30-250 microns thick made of polyethylene, polypropylene, polyvinylidene chloride or its copolymers, polyvinyl chloride, polyamide, polyester, or laminated films of these, and then sealed at the ends of the container, the moisture permeation preventive character of the film containers is not sufficient, leading to a fatal problem of hardening of the sealant during the storage period.

When an aluminum-laminated film is used as the material for the film container, the hardening of the sealant can be delayed to some degree because of a better moisture permeation preventive character. However, an aluminum-laminated film easily develops pinholes at the time of handling because of bending, and these pinholes allow moisture into the sealant which promotes hardening of the sealant.

In addition, an aluminum-laminated film, which is harder than a resin film, is difficult to seal, thus requiring a heat sealing or bond sealing process at the time of sealing. Heat sealing, however, becomes impossible when the contained sealant adheres to the heat-sealing part. In addition, heat-sealing is not a generally suitable way of avoiding air bubbles inside the container.

In addition, because of its rigidity, aluminum-laminated film is not easily crushed at the time of extrusion of the sealant with a caulking gun and a fairly significant amount of sealant remains in the container without having been extruded when the container is made of this material. Therefore, an aluminum-laminated film by itself is not suitable as a material for this type of container.

When the film thickness of the container is doubled, the hardening time of the sealant can be prolonged to some degree. Still, this is not sufficient for preventing the hardening of a sealant for a fully practical storage period. In addition, the doubling of the film has little effect on the prevention of the hardening which starts from the sealed ends.

This invention therefore tends to overcome the defects mentioned above and is economical and easy to use.

THE INVENTION

This invention therefore consists of a water-impermeable package for room temperature, moisture curing one-part sealants which consists of a sealable inner flexible resin film container and a sealable outer resin film wrap which resin film wrap has, on at least one surface, a thin layer of aluminum.

This invention also consists of a method of storing room temperature moisture curing one-part sealants which consists of placing a moisture curable, one-part sealant in a sealable inner flexible resin film container, which container is enclosed by a separate sealable outer resin film wrap which outer resin film wrap has, on at least one surface, a thin layer of aluminum.

Generally, a room temperature, moisture curing sealant is introduced into a soft resin film container which soft resin film forms the inner layer of the package. The open ends of this tube-like container are then sealed by some suitable means such as tying the ends with a small string or a small diameter wire. The container is then wrapped with an outer layer of an aluminum-laminated resin film or a resin film which has been vacuum deposited with an aluminum layer on at least one of its sides. This outside wrapping film is then sealed on the ends such as by bonding with an adhesive or by heat sealing.

This invention deals with a package which is formed in the following way. A room temperature curing, one part sealant is introduced into a soft resin film container. The open ends of the container are tied and bound with a small stringlike piece of material. One or more of these containers filled with the sealant are wrapped with an aluminum-laminated resin film or resin film with a vacuum-deposited aluminum layer. This outside wrapping film then is airtight-sealed with heating or with a bonding agent.

The requirements for the resin film to be used for the inner resin film container are softness with flexibility, a low, nearly total lack of moisture-permeability, the absence of a tendency to cause deterioration or modification of the room-temperature, moisture-curing sealants and the absence of a tendency to deteriorate or be modified by the room-temperature, moisture-curing sealants. Examples of films satisfying such requirements are polyethylene film, polypropylene film, polyvinylidene chloride film, or laminated combinations of these films. These films can be those that are normally used for containing one-part sealants. The desirable thickness of these films ranges from 25 to 250 microns. Although the shape of the container is not limited, a cylindrical shape is desirable for ease of preparation and easy of handling under conditions of use.

The aluminum-laminated resin film used is aluminum foil laminated on both sides or one side with one kind or a combination of two kinds of resin film. The appropriate thickness of the aluminum foil ranges from 3 microns to 60 microns. The thickness of the resin film is 5 to 150 microns.

The required characteristics for the resin films to be used in the outer layer are softness with flexibility, a low, or nearly complete lack of, moisture-permeability, the absence of a tendency to cause the deterioration or modification of the room-temperature, moisture-curing, one-part sealant, and the absence of a tendency to deteriorate or be modified by the room-temperature, moisture-curing, one-part sealant. Examples of such resin films are polyethylene film, polypropylene film, polyvinylidene chloride film, vinylidene chloride-vinyl chloride copolymer film, polyvinyl chloride film, polyvinyl acetate film, polyamide film and polyester film normally used for one-part sealants.

The film with vacuum-deposited aluminum is a resin film onto which aluminum has been vacuum-deposited on one or both sides and, further, laminated with the same or a different resin film. The thickness of the resin film is 5-150 microns, and the thickness of the vacuum-deposited aluminum layer is 20-100 millimicrons. The kinds of desirable resin films are the same as those described in relation to the aluminum-laminated resin film.

The manner of wrapping the resin film container filled with a room-temperature/moisture-curing, one-part sealant with an aluminum-laminated resin film or resin film with vacuum-deposited aluminum is not specially limited. For example, it is possible to use an arrangement in which each inner container is packaged individually as illustrated in FIG. 1 or with continuous wrapping, having the packages of individual containers attached at the sealed parts, where 2-10 containers can be wrapped in a bundle for storage.

FIG. 1 illustrates the package in its finished form and is a plan view of the package.

Number 1 indicates the sealant material which is to be protected and 2 indicates the sealable inner flexible resin film container with the sealed end 4. The sealable outer resin film wrap having an aluminum layer is designated as 3 and the sealed ends of the wrap are designated 5. In use, one end of the package is snipped off to allow flow of the sealant, the package is mounted in an extrusion gun and the sealant is thereafter extruded.

By using an aluminum-laminated resin film or a resin film with vacuum-deposited aluminum, the hardening of the sealant in the inside container is remarkably delayed because these films have a markedly higher moisture preventive effect than simple resin films.

Although pinholes can be generated on the aluminum part of an aluminum-laminated resin film because of bending, the moisture passing through the pinholes in the outside wrap of the double wrapping of this invention does not come in direct contact with the sealant. The moisture is trapped between the outside wrap and the inside wrap, and, moreover, it takes time for such diluted moisture to permeate through the inside wrapping film. In this way, the sealant is prevented from hardening during the storing period. The pinholes on an aluminum-laminated resin film are extremely small compared with the total outside surface area. The hardening of the sealant does not occur because the moisture permeating into the wrap is extremely small in amount, and the moisture does not come in direct contact with the sealant in the vicinity of a pinhole because of the double wrapping.

Because an aluminum-laminated resin film or resin film with vacuum-deposited aluminum is used for the outside wrapping in this invention, the bulk of the wasted materials is a little larger than the case where only a cylindrical resin film container is used. When compared with the use of cartridges, the bulk of those soft films is much smaller.

The experimental examples of this invention and the control examples are shown below.

EXAMPLE 1

An inner resin film container of a copolymer resin film consisting of 90 mol % of vinylidene chloride and 10 mol % of vinyl chloride, 40 microns in thickness, was filled with a room-temperature, moisture-curing, one-part silicone sealant. After both ends were tied with kite string, this container was packed in an aluminum-laminated film outside wrapper of polyethylene (30 microns)/aluminum (7 microns)/polyethylene (15 microns)/polypropylene (20 microns), and the outer wrapper was heat-sealed at the edges and ends. After a year of storage in a warehouse, the contents of this package were found not to have hardened, nor to have undergone changes in physical properties.

CONTROL EXAMPLE 1

The inner resin film container filled with sealant as shown in Example 1 which was packed in a polyethylene (30 microns)/polyester (15 microns)/polypropylene (20 microns) resin film as the outer wrapper was stored in a warehouse. Two months later, the sealant started hardening.

EXAMPLE 2

An inner resin film container of polyethylene film, 60 microns in thickness was filled with a room-temperature, moisture-curing, one-part urethane sealant. This was wrapped with the aluminum-laminated film used in Example 1 as the outer wrapper, and stored in a warehouse for a year. No hardening took place.

CONTROL EXAMPLE 2

The sealant packed in the film container described in Example 2 was stored without the outside wrapping. The contents started hardening in one month.

CONTROL EXAMPLE 3

A room-temperature, moisture-curing, one-part silicone sealant was introduced into an aluminum-laminated resin film container of polyester (12 microns)/aluminum (9 microns)/polyethylene (15 microns)/polypropylene (30 microns), and the ends were heat sealed. The hardening of the contents started after 3 months from a point near the bent part of the film.

That which is claimed is:

1. A method of storing room temperature moisture curing one-part sealants which consists of placing a moisture curable, one-part sealant in a sealable inner flexible resin film container, which container is enclosed by a separate sealable outer resin film wrap which outer resin film wrap has, on at least one surface, a thin layer of aluminum.

2. A method as claimed in claim 1 wherein the sealable inner flexible resin film container is constructed from a polymer selected from a group consisting of polyethylene, polypropylene, polyvinylidene chloride, vinylidene chloride-vinyl chloride copolymer, polyvinyl chloride, polyamide or polyester.

3. A method as claimed in claim 1 wherein the sealable outer resin film wrap is constructed from a polymer selected from a group consisting of polyethylene, polypropylene, polyvinylidene chloride-vinyl chloride, polyvinyl chloride, polyvinyl acetate, polyamide and polyester, and has an aluminum layer on at least one side of the wrap.

4. A method as claimed in claim 2 wherein the sealable inner flexible resin film has a thickness of 25–250 microns.

5. A method as claimed in claim 3 wherein the sealable outer resin film wrap has a thickness of 5–150 microns and the aluminum layer is 3–60 microns thick.

6. A method as claimed in claim 5 wherein the aluminum layer is aluminum foil.

7. A method as claimed in claim 5 wherein the aluminum layer is vacuum deposited aluminum.

8. A method of storing room temperature moisture curing one-part sealants as claimed in claim 1 wherein the sealable inner flexible resin film is composed of 90 mol % vinylidene chloride and 10 mol % of vinyl chloride and is 40 microns thick and the sealable outer resin film wrap is composed of a laminate of polyethylene 30 microns thick; aluminum foil 7 microns thick; polyethylene 15 microns thick and polypropylene 20 microns thick.

9. A method of storing room temperature moisture curing one-part sealants as claimed in claim 1 wherein the sealable inner flexible resin film container is constructed from more than one flexible resin film selected from a group consisting of polyethylene, polypropylene, polyvinylidene chloride, vinylidene chloride-vinyl chloride copolymer, polyvinyl chloride, polyamide and polyester.

10. A method of storing room temperature moisture curing one-part sealants as claimed in claim 1 wherein the sealable outer resin film wrap is constructed from more than one resin film selected from a group consisting of polyethylene, polypropylene, polyvinylidene chloride-vinyl chloride copolymer, polyvinyl chloride, polyvinyl acetate, polyamide and polyester, and which has an aluminum layer on at least one side of the wrap.

* * * * *